(12) United States Patent
Lekutai

(10) Patent No.: US 8,396,507 B2
(45) Date of Patent: Mar. 12, 2013

(54) SYSTEM AND METHOD FOR INDICATING EXPECTED COMMUNICATION SPEED IN A WIRELESS COMMUNICATION DEVICE

(75) Inventor: Gaviphat Lekutai, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 838 days.

(21) Appl. No.: 12/335,054

(22) Filed: Dec. 15, 2008

(65) Prior Publication Data

US 2010/0151899 A1    Jun. 17, 2010

(51) Int. Cl.
*H04M 1/00* (2006.01)

(52) U.S. Cl. ............... 455/550.1; 455/561; 455/522

(58) Field of Classification Search .......... 455/550.1, 455/556.1, 560, 561, 565, 567, 522, 90.1, 455/90.2, 91, 115.3, 115.4, 132, 136, 138; 370/335, 342, 350, 516, 252, 310
See application file for complete search history.

(56) References Cited

U.S. PATENT DOCUMENTS

| | | | |
|---|---|---|---|
| 7,529,639 B2 * | 5/2009 | Rasanen et al. | 702/150 |
| 7,894,404 B2 * | 2/2011 | Hahm et al. | 370/335 |
| 2007/0094691 A1 * | 4/2007 | Gazdzinski | 725/62 |
| 2009/0005102 A1 * | 1/2009 | Das et al. | 455/522 |
| 2009/0086657 A1 * | 4/2009 | Alpert et al. | 370/310 |
| 2009/0135731 A1 * | 5/2009 | Secades et al. | 370/252 |

FOREIGN PATENT DOCUMENTS

JP    WO2007/072928    * 6/2007

* cited by examiner

*Primary Examiner* — Tuan H. Nguyen
*Assistant Examiner* — Chung-Tien Yang
(74) *Attorney, Agent, or Firm* — Moazzam & Associates, LLC (57) ABSTRACT

A wireless communication network includes a number of users communicating via wireless communication devices. The network determines a current condition of the network, including factors such as the number of users coupled to a particular portion of the wireless communication network. The current conditions are used to access data in a data storage structure to determine an expected communication speed based on the current network conditions. The expected communication speed for each wireless communication device is transmitted to the wireless communication device and shown on the display. The display of expected communication speed may take various forms, such as a numeric display, graphical display, color display, or an alphabetic display. The network dynamically monitors changes in the current conditions and recalculates the expected communication speed as appropriate.

36 Claims, 6 Drawing Sheets

| DOWNLINK SPEED (kbps) | | | | | | |
|---|---|---|---|---|---|---|
| USER 1 | USER 2 | USER 3 | USER 4 | USER 5 | USER 6 | USER 7 |
| 1505 | | | | | | |
| 785 | 995 | | | | | |
| 554 | 625 | 629 | | | | |
| 451 | 484 | 468 | 435 | | | |
| 394 | 406 | 368 | 351 | 370 | | |
| 327 | 322 | 300 | 301 | 331 | 306 | |
| 263 | 268 | 270 | 277 | 276 | 271 | 261 |

| UPLINK SPEED (kbps) | | | | | | |
|---|---|---|---|---|---|---|
| USER 1 | USER 2 | USER 3 | USER 4 | USER 5 | USER 6 | USER 7 |
| 1080 | | | | | | |
| 904 | 885 | | | | | |
| 383 | 387 | 357 | | | | |
| 380 | 351 | 348 | 359 | | | |
| 273 | 278 | 270 | 270 | 276 | | |
| 210 | 216 | 198 | 195 | 207 | 203 | |
| 166 | 146 | 165 | 162 | 158 | 156 | 158 |

FIG.4A

| THROUGHPUT SPEED IN kbps | | | | | | |
|---|---|---|---|---|---|---|
| DOWNLOAD | UPLOAD | | | | | |
| USER 1 | USER 1 | USER 2 | USER 3 | USER 4 | USER 5 | USER 6 |
| 1471 | | | | | | |
| 1402 | 939 | | | | | |
| 1447 | 350 | 405 | | | | |
| 1404 | 290 | 361 | 345 | | | |
| 1471 | 258 | 292 | 285 | 294 | | |
| 1420 | 194 | 185 | 193 | 198 | 194 | |
| 1445 | 169 | 149 | 170 | 152 | 169 | 177 |

| THROUGHPUT SPEED IN kbps | | | | | | |
|---|---|---|---|---|---|---|
| UPLOAD | DOWNLOAD | | | | | |
| USER 1 | USER 1 | USER 2 | USER 3 | USER 4 | USER 5 | USER 6 |
| 1079 | | | | | | |
| 1020 | 1424 | | | | | |
| 750 | 846 | 848 | | | | |
| 441 | 536 | 667 | 550 | | | |
| 389 | 403 | 490 | 413 | 493 | | |
| 369 | 344 | 389 | 362 | 390 | 354 | |
| 345 | 313 | 331 | 323 | 342 | 288 | 280 |

FIG.4B

| DOWNLINK SPEED (kbps) | | | | |
|---|---|---|---|---|
| NEAR | FAR | FAR | FAR | FAR |
| USER 1 | USER 1 | USER 2 | USER 3 | USER 4 |
| 1748 | | | | |
| 1042 | 1044 | | | |
| 844 | 843 | 861 | | |
| 684 | 654 | 731 | 651 | |
| 532 | 506 | 575 | 526 | 549 |

| UPLINK SPEED (kbps) | | | |
|---|---|---|---|
| NEAR | FAR | FAR | FAR |
| USER 1 | USER 1 | USER 2 | USER 3 |
| 1088 | | | |
| 528 | 502 | | |
| 367 | 348 | 379 | |
| 236 | | 259 | 274 |

SYSTEM AND METHOD FOR INDICATING EXPECTED COMMUNICATION SPEED IN A WIRELESS COMMUNICATION DEVICE

BACKGROUND OF THE INVENTION

1. Field of the Invention

The present invention is directed generally to wireless communication and, more particularly, to a system and method for providing a user indication of expected communication speed in a wireless communication device.

2. Description of the Related Art

Wireless communication in its early form provided simple two-way voice communication in the form of cellular telephones. Since those early days, wireless communication has expanded greatly to include a great number of applications. In addition to conventional voice communication, modern wireless devices include email, text messaging, music, web surfing, and even video downloads and video streaming. To accommodate the higher bandwidth requirements of such applications, new generations of wireless technology have evolved. Early technologies, such as advance mobile phone service (AMPS), were replaced with more advanced technologies such as global system for mobile communication (GSM).

New technologies, generally categorized as third generation (3G) networks, have evolved to accommodate the wide bandwidth applications.

It is widely known that wireless devices have an indicator that shows the signal strength of the connection between the wireless device and the network. In a typical implementation, the wireless device may display signal strength as a number of "bars" shown on the display. In this application, one bar may indicate a low signal strength, while four or five bars indicates a high signal strength. With older technologies such as GSM, the number of bars may also provide an indication to the user of the expected communication speed between the wireless device and the wireless network. For example, one bar in a GSM system would indicate a low signal strength and relatively low download speeds. Similarly, five bars in a GSM wireless system would indicate a high signal strength and a relatively high download speed. Thus, the expectation by the user is that a good signal strength will result in a high data rate, while a low signal strength may result in a low data rate.

Unfortunately, with newer technologies, the signal strength does not necessarily relate to the expected speed of downloads or uploads. That is, a high signal strength (e.g., five bars) may not result in high speed communication between the network and the wireless device while a low signal strength (e.g., one bar) does not necessarily mean that the user will not be provided with a high speed connection between the mobile device and the wireless network.

Therefore, it can be appreciated that there is a significant need for a system and method to provider the user with an indication of an expected communication speed between the user's wireless device and the wireless network.

DETAILED DESCRIPTION OF THE INVENTION

The present disclosure is directed to techniques that provide the user with an indication of the expected communication speed. That is, the techniques described herein will estimate the communication speed between a wireless communication device and the wireless communication network and will provide that indication to the user. As conditions within the wireless network change, the expected speed may alter and the indicator to the user of the mobile device will also alter in a corresponding manner. This indication is provided to the user independent of any signal strength measurement provided by conventional wireless techniques.

Although examples presented herein may be directed to a particular signaling protocol, those skilled in the art will appreciate that the principles presented herein are broadly applicable to third generation (3G) systems and beyond. For example, the present disclosure is applicable to Wideband Code Division Multiple Access (W-CDMA), Universal Mobile Telecommunications System (UMTS), High Speed Packet Access (HSPA), including both uplink (HSUPA) and downlink (HSDPA), and others. The principles of the present invention are also applicable to newer generations in current planning, such as Long Term Evolution (LTE) and the like. Accordingly, the present disclosure is not limited to a specific signaling protocol.

Figure 1:
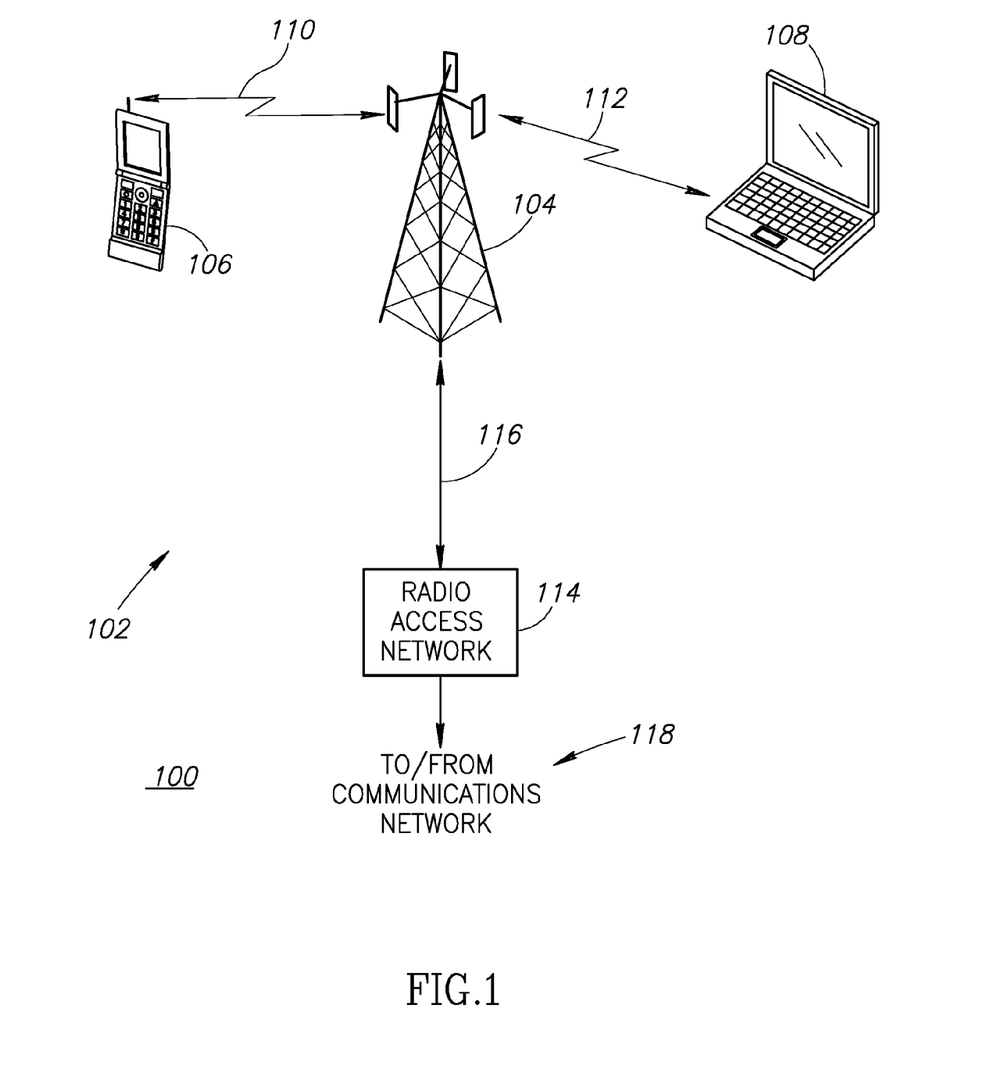
FIG. 1 is an example of a wireless system architecture constructed in accordance with the present teachings.

FIG. 1 illustrates an exemplary architecture of a system 100 constructed in accordance with the present teachings. A wireless communication network 102 includes a base station 104. A wireless communication device 106 and a wireless communication device 108 communicate with the base station 104 via wireless communication links 110 and 112, respectively. The base station 104 communicates with a Radio Access Network (RAN) 114 via a communication link 116. The communication link 116 may be a hard wired link, wireless link, optical link, a combination of one or more of the above, or the like.

In a typical installation, a single RAN 114 controls multiple base stations. The RAN 114 is a commercial device available from multiple manufacturers. In some system architectures, a Radio Network Controller (not shown) or other equivalent network element may provide the functionality of the RAN 114 described herein.

The RAN 114 functions as a gateway between the wireless portion of the wireless communications network and a core portion of the communications network 118.

Those skilled in the art will appreciate that a typical wireless communication network will include a large number of base station with each base station having a large number of mobile units communicating therewith. However, for the sake of clarity, FIG. 1 illustrates only a single base station (i.e., the base station 104) only two wireless communication devices (i.e., the wireless communication device 106 and the wireless communication device 108). In addition, for clarity of exposition FIG. 1 does not illustrate a number of conventional network components, such as a mobile switching center (MSC), firewalls, routers, and the like that form part of the core network 118.

The wireless communication devices 106 and 108 are representative of a broad class of wireless communication devices capable of operation with the wireless network 102.

The wireless communication device 106 may be a wireless phone, web-enabled device, personal digital assistant (PDA), or the like. The wireless communication device 108 may be a wireless computer. The system 100 is not limited by the specific form of the wireless communication devices 106 and 108.

The term "expected communication speed," as used herein, refers to the end-to-end communication speed between a wireless communication device (e.g., wireless communication device 106) and the communications network (e.g., the core network 118). That is, it includes not only the communication between the base station 104 and wireless communication device 106, but also includes communication within the communications network itself. For example, the expected communication speed is the speed for transfer of data from a server (not shown) within the core network 118 all the way to the wireless communication device. Those skilled in the art will appreciate that the actual communication speed may vary depending on a number factors. For example, the latencies within the core network 118 (see FIG. 1) may vary depending on the particular routing of data throughout the network as well as latencies that may depend on the particular network element to which data is being transmitted or from which data is being received. While it is possible to calculate an estimated communication speed based on such factors within the core network 118, it is known that such latencies within the network tend to be relatively uniform. In contrast, factors such as the number of users communicating within the same sector of a base station, and the activity of those users, tend to have a greater impact on the expected communication speed. The expected communication speed estimated herein includes delays within the core network 118, but is based on the factors that have the greatest affect on the expected communication speed.

Figure 2:
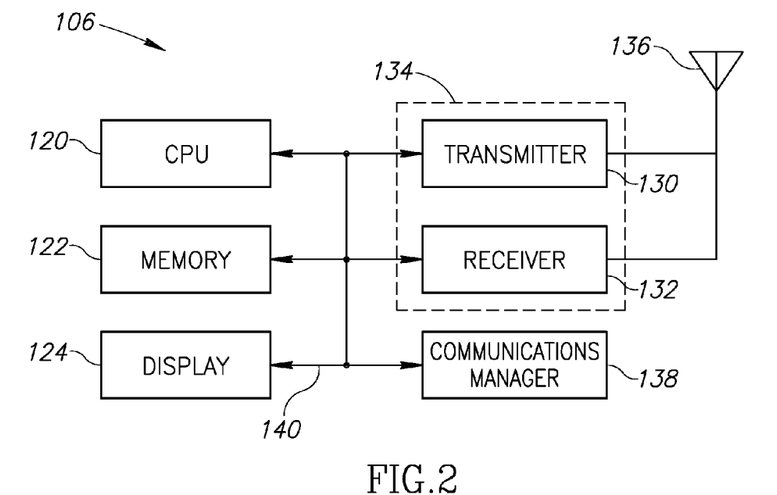
FIG. 2 is a functional block diagram of a wireless communication device used in the wireless communication system of FIG. 1.

FIG. 2 is a functional block diagram of a wireless communication device, such as the wireless communication device 106 illustrated in FIG. 1. The wireless communication device 106 includes a central processing unit (CPU) 120. Those skilled in the art will appreciate that the CPU 120 may be implemented as a conventional microprocessor, application specific integrated circuit (ASIC), digital signal processor (DSP), programmable gate array (PGA), or the like. The wireless communication device 106 is not limited by the specific form of the CPU 120.

The wireless communication device 106 also contains a memory 122. The memory 122 may store instructions and data to control operation of the CPU 120. The memory 122 may include random access memory, read-only memory, programmable memory, internal or external flash memory, and the like. The wireless communication device 106 is not limited by any specific form of the hardware used to implement the memory 122. The memory 122 may also be integrally formed in whole or in part with the CPU 120. The wireless communication device 106 also includes conventional components, such as a display 124. For the sake of brevity, other conventional components, such as audio input and output devices, key pad, and the like, are omitted from FIG. 2. However, the operation of these components is well known in the art and need not be described in greater detail herein.

The wireless communication device 106 also includes a transmitter 130 such as may be used for normal wireless communication with the base station 104 (see FIG. 1). FIG. 2 also illustrates a receiver 132 that operates in conjunction with the transmitter 130 to communicate with the base station 104. In a typical embodiment, transmitter 130 and receiver 132 are implemented as a transceiver 134. The transceiver 134 is connected to an antenna 136. Operation of the transceiver 134 and the antenna 136 is well known in the art and need not be described in greater detail herein. Those skilled in the art will recognize that many of the components described in FIG. 2 with respect to the wireless communication device 106 are also applicable to the wireless communication device 108. If the wireless communication device 108 is a wireless computer, it may include additional components such as a keyboard, disc drive, optical storage device, network interface controller, and the like. However, the functional block diagram of FIG. 2 illustrates the essential elements required for proper implementation of a wireless communication system in accordance with the present teachings.

FIG. 2 also illustrates a communications manager 138. The communications manager 138 operates in a conventional wireless device to provide a visual indication of signal strength. As previously discussed, the signal strength is typically represented as a series of bars shown on the display 124. That is, a single bar may indicate a low signal strength connection between the wireless communication device 106 and the base station 104 while a greater number of bars on the display 124 indicate a correspondingly greater signal strength. Although the display of one or more bars to illustrate signal strength provides an easy visual indicator to the user, the communications manager 138 could provide this indication in a variety of different manners.

With older generation communication networks, signal strength could also serve as a general indicator of the communication speed between a wireless device and the wireless network. However, the signal strength indicator in high speed data networks is not necessarily indicative of a communication speed with which data may be exchanged between the wireless communication device 106 and core network 118 via the RAN 114 and the base station 104. As will be described in greater detail below, the communications manager 138 constructed in accordance with the present teachings provides an additional indicator to the user of the expected communication speed between the wireless communication device 106 and the communications network.

Those skilled in the art will recognize that the communications manager 138 may be implemented as a series of instructions stored in the memory 122 and executed by the CPU 120. However, the communications manager 138 is shown as a separate block in the functional block diagram of FIG. 2 because it performs a separate function.

The various components illustrated in FIG. 2 are coupled together by a bus system 140. The bus system 140 may include an address bus, data bus, power bus, control bus, and the like. For the sake of convenience, the various buses in FIG. 2 are illustrated as the bus system 140.

Figure 3:
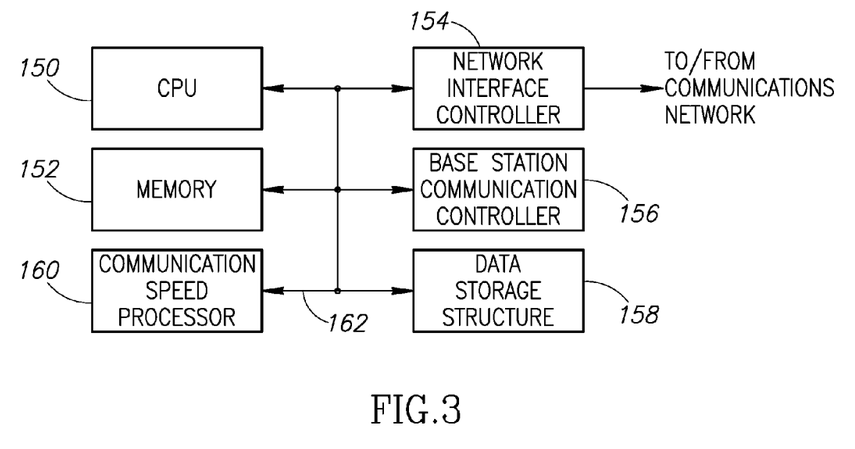
FIG. 3 is a functional block diagram of the radio access network of FIG. 1.

FIG. 3 is a functional block diagram of the RAN 114 illustrated in FIG. 1. The RAN 114 is a commercial product sold by a number of vendors and provides a gateway interface between the wireless communication devices (e.g., the wireless communication devices 106 and 108 of FIG. 1) and the communication network. Although the RAN 114 includes many components, the functional block diagram of FIG. 3 only includes a few simple elements to illustrate implementation of the expected communication speed indicator.

The RAN 114 includes a CPU 150 and a memory 152. As described above with respect to the wireless communication device, the CPU 150 and memory 152 can be implemented by a number of different known technologies. The memory 152 provides data and instructions for execution by the CPU 150.

The RAN 114 includes a network interface controller (NIC) 154. The NIC 154 provides a communication interface between the RAN 114 and other portions of the communication network (e.g., the core network 118). The NIC 154 may be implemented as a wireless interface, wired interface, such as an Ethernet connection, optical connection, or combination of one or more of the above.

The RAN 114 also includes a base station communication controller 156. The base station communication controller 156 controls communication between the RAN 114 and the base station 104. As previously noted, the RAN 114 typically controls operation of a number of base stations. The base station communication controller 156 is generically illustrated in FIG. 3, but is capable of communication with a plurality of base stations. The operation of the base station communication controller 156 is known in the art, and need not be described in greater detail.

The RAN 114 also includes a data storage structure 158. As will be described in detail below, the data storage structure 158 contains data used to determine the expected communication speed between the wireless communication device 106 and the core network 118. The data storage structure 158 may be conveniently organized in the form of data tables that allow a quick look-up to determine an expected communication speed between the wireless communication device 106 and the core network 118. The data within these tables will be described in greater detail below. However, the system 100 is not limited by the specific form (e.g., data tables, database, spreadsheet, etc.) of the data storage structure 158. In one embodiment, the data storage structure 158 may be part of the memory 152.

The RAN 114 further includes a communication speed processor 160. As will be described in greater detail below, the communication speed processor uses the data in the data storage structure 158 to determine an expected communication speed based on current conditions within the communication network. For example, the expected communication speed may be dependent on a number of factors, such as the number of users within a particular sector. The communication speed processor 160 gathers information from the communication network to determine factors, such as the number of users currently communicating in a particular sector of the network, the location of the various wireless communication devices from the base station (e.g., the base station 104 of FIG. 1) as well as the activities of users within a sector (e.g., uploading or downloading data). Based on these indicia of the current conditions, the communication speed processor 160 accesses the appropriate data from the data storage structure 158 to readily determine an expected communication speed for each of the wireless communication devices coupled to the network.

The various components illustrated in the functional block diagram of FIG. 3 are coupled together by a bus system 162. As discussed above with respect to the bus system 140 in FIG. 2, the bus system 162 is illustrative of a number of different bus structures within the RAN 114.

Those skilled in the art will appreciate that certain elements illustrated in the functional block diagram of FIG. 3 may be implemented as a series of instructions stored in the memory 152 and executed by the CPU 150. For example, the communications speed processor 160 may typically be implemented as a software module executed by the CPU 150. However, it is illustrated as a separate block in the functional block diagram of FIG. 3 because it performs a separate function.

As is known in the art, a base station, such as the base station 104 (see FIG. 1) provides an overall area of coverage base on factors such as the height of the base station antenna, natural or man-made obstructions, transmitter power, and the like. The overall area of coverage for a particular base station is typically subdivided into a number of sectors. For example, the overall coverage area for the base station 104 may typically be a roughly circular pattern. The circular area of coverage may be divided into, by way of example, three sectors, each providing approximately 120 degrees of coverage.

It has been determined that communication speed with any given wireless device depends on a number of factors. However, some of the more important factors in determining expected communication speed are the number of users within the same sector, the activities of the users within the sector, and the location of the users in the sector with respect to the base station.

Figure 4A:
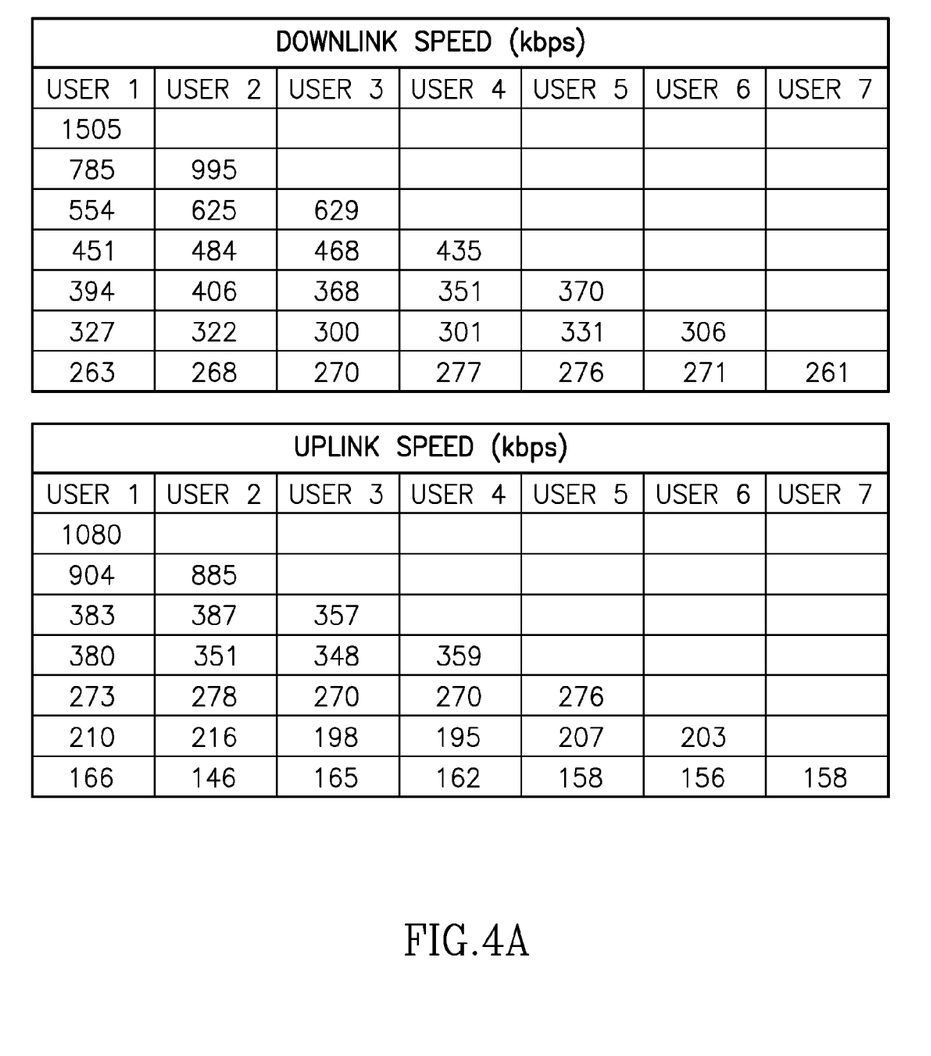
FIGS. 4A-4C illustrate a set of data tables used by the radio access network to determine an expected communication speed.
Figure 4B:
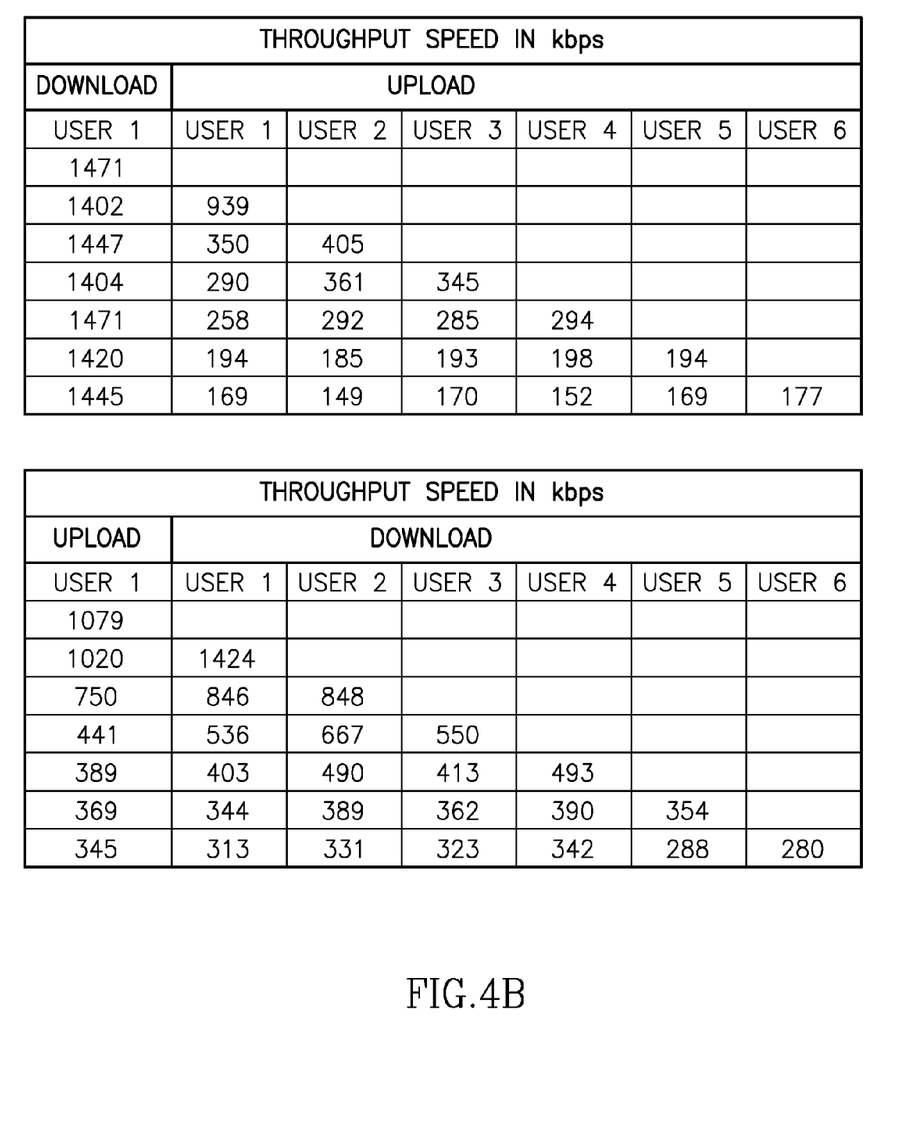
Figure 4C:
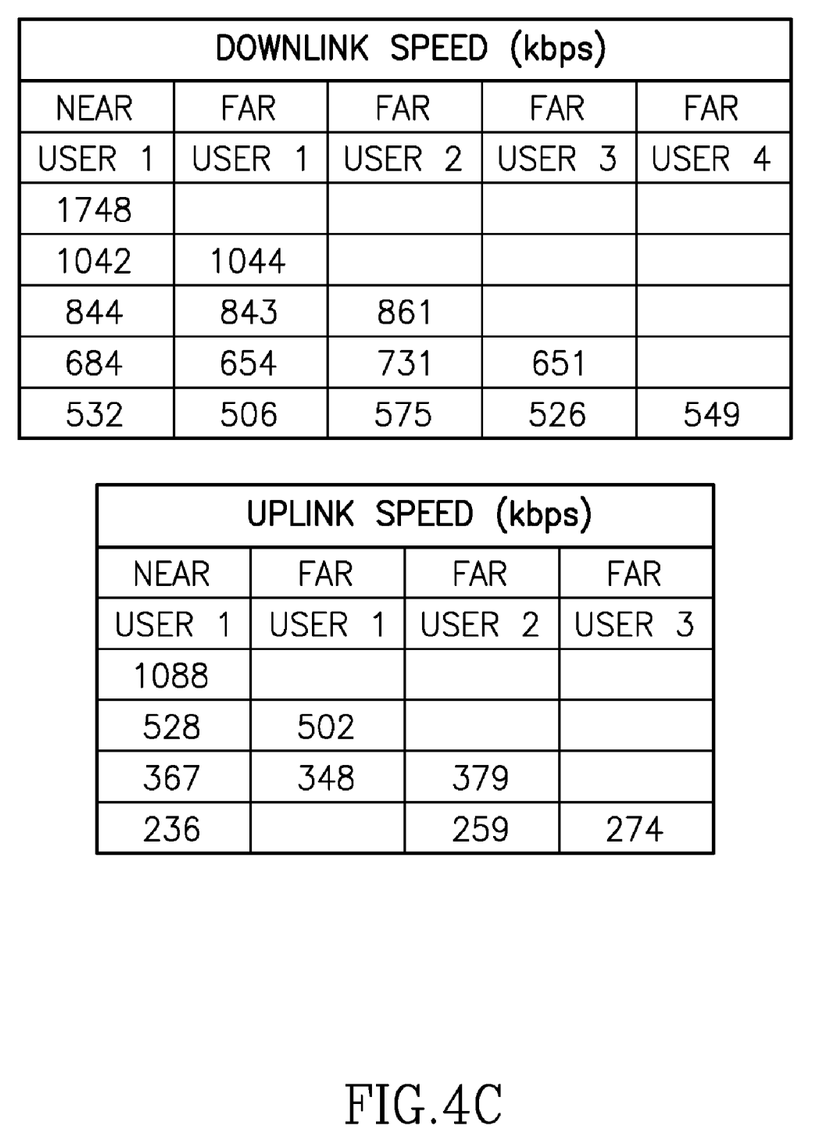

Based on the user-selected activity, as well as other local network conditions, the communication speed processor 160 (see FIG. 3) will access one or more tables shown in FIGS. 4A-4C. Those skilled in the art will appreciate that the RAN 114 can readily determine the number of users being served in each sector of an area of coverage provided by the base station 104 (see FIG. 1) as well as the type of activity in which the users are engaged. For example, the RAN 114 may determine that, by way of example, there are ten users registered with the network and operating in the same sector as the wireless communication device 106. However, not all ten users may be simultaneously accessing the wireless communication network. The following series of examples will illustrate the selection of the appropriate data table accessed by the communication speed processor 160. In one example, consider that the user of the wireless communication device 106 wishes to download data and that two of the ten users within the same sector are also actively downloading data (the remaining eight users in the sector are presently idle or inactive). In this example, the communication speed processor 160 would access the data in the data storage structure 158 to retrieve data illustrated in the top portion of FIG. 4A. When the user of the wireless communication device selects a download activity, there are three users now performing downloads from the network. In the download speed table (i.e., the top portion of FIG. 4A) the expected downlink speed for three users is illustrated in the third line of the table. From the table, the user could expect a download speed of between 554 kilobytes per second (kbps) to 629 kbps. In one embodiment, the communication speed processor may average the three values (i.e., 554 kbps, 625 kbps, and 629 kbps) to generate an average expected communication speed (i.e., 603 kbps in the present example) for a download operation. Thus, the communication speed processor 160 quickly accesses the appropriate data table and determines an expected communication speed for the wireless communication device 106 for the activity selected by the user.

It should be noted that the data in FIGS. 4A-4C have been derived from actual performance measurements. In an exemplary embodiment, a designated server within the core network 118 (see FIG. 1) stores files of various sizes. From various locations throughout the network, a wireless communication device (e.g., the wireless communication device 106 of FIG. 1) requests a download of one or more of the files from the designated server. The wireless communication network 100 can track the time from delivery of the user request to completion of the file from the designated server. From this data, the expected communication speed can be determined for the conditions existing at the time the request is made by the wireless communication device 106. Thus, actual performance measurements can be obtained for various network conditions. These performance measurements form the basis for the data stored in the tables illustrated in FIGS. 4A-4C.

In one embodiment, the data in the tables of FIGS. 4A-4C is relatively static. Performance measurements may be made at one time and the data stored for future use. Performance measurements may be periodically conducted to reflect overall changes in network topology. This also takes into account other changes in the network technology that may affect the expected communication speed. For example, improvements in overall technology may result in an increase in the expected communication speed. Thus, performance measurements may be periodically performed and the data in the data storage structure 158 (see FIG. 3) updated. In yet another alternative embodiment, the wireless communication system may dynamically monitor network performance by monitoring flows through various modes in the wireless communication network 100 calculating performance measurements based thereon. This may provide more dynamic measurements of the expected communication speed.

In yet another alternative embodiment, the data storage structure 158 may contain hypothetical expected communication speeds. For example, if the maximum hypothetical download speed is 1500 kbps, the data table in the top portion of FIG. 4 could simply have entries where the hypothetical maximum rate is divided by the number of users. In the present example, the hypothetical 1500 kbps transfer rate is divided by three (i.e., three users performing download operations) resulting in an expected communication speed of approximately 500 kbps for each user.

In a second example, assume that the user of the wireless communication device 106 is performing an upload operation and that two of the ten users in the same sector are also performing upload operations (the remaining eight users in the sector are presently idle or inactive). Thus, only uplink operations are being performed by users at the present time. In this example, the communication speed processor 160 would use the bottom portion of the table in FIG. 4A, which indicates expected communication speeds when users are performing only upload operations. In the present example, the communication speed processor 160 would use the third entry in the bottom portion of the table in FIG. 4A corresponding to three users performing uplink operations within the same sector of coverage provided by the base station 104 (see FIG. 1). In the present example, the expected upload speed ranges from 357 kbps to 387 kbps. As previously discussed, an average of these actual numbers could be provided to the wireless communication device 106 as the expected uplink speed. Alternatively, hypothetical numbers could be provided in place of these actual measured values.

If, in the present example, one other user completes the upload operation, there are now only two users in this sector that are actively uploading data. The RAN 114 detects the change in the network conditions and performs an additional lookup of the data in the data storage structure 158. In the bottom portion of the table in FIG. 4A, the second lines indicates the expected speed for two users performing upload operations. Thus, the new expected communications speed is 885 kbps to 904 kbps. The speed communication processor 160 (see FIG. 3) makes the determination of the new expected communication speed and transmits that information to the two wireless communication devices (including the wireless communication device 106) interactively uploading data.

In another example of the use of the tables of FIGS. 4A-4C, assume that the user of the wireless communication device 106 wishes to download data while other users in the same sector are uploading data. As noted above, the RAN 114 can readily determine how many users are within a particular sector as well as determining how many active users are uploading data and how many active users are downloading data within the particular sector. The tables of FIG. 4A may be used by the communication speed processor 160 (see FIG. 3) when the user of the wireless communication device 106 is performing the same activity (i.e., either uploading data or downloading data) as other active users within that sector. The communication speed processor 160 will use the data tables of FIG. 4B when the user wishes to perform an activity different from the activity of other users in that sector. For example, if a user wishes to download data while other users in the same sector are uploading data, the communication speed processor 160 utilizes the top portion of the data in FIG. 4B. In contrast, if the user wishes to upload data while other users in the sector are downloading data, the communication speed processor 160 uses the bottom portion of the data in FIG. 4B.

Continuing with the previously described example, assume that ten users are within a particular sector, and that two of the users are actively uploading data. In contrast, the user of the wireless communication device 106 wishes to download data. In this example, the communication speed processor 160 would use the top portion of the data in FIG. 4 and look at the data in the third line in which the user is downloading data while two other users in that same sector are actively uploading data. As shown in this table, the expected download speed is 1447 kbps. As can be seen in the top portion of the table in FIG. 4B, the download speed for an individual user is not significantly affected by the number of users in that same sector that are uploading data.

In yet another example, if the user of the wireless communication device 106 (see FIG. 1) wishes to upload data while two other users in the same sector are in the process of downloading data, the communication speed processor 160 utilizes the bottom portion of the data in FIG. 4B. Using the third line of the table, it can be readily determined that the expected upload communication speed is 750 kbps. The communication speed processor 160 sends this data to the wireless communication device 106 via the RAN 114 and the base station 104. The communications manager 138 will display the appropriate data indicating the expected upload speed. If an additional user within the same sector begins a download process, the communication speed processor 160 will recalculate the expected upload speed. In the present example, where there are now three users actively downloading data in the same sector, the expected upload communication speed for the wireless communication device drops from 750 kbps to 441 kbps. The communication speed processor 160 sends the new expected communication speed to the wireless communication device 106 in the manner described and the communications manager 138 within the wireless communication device will display the decreased expected communication speed on the display 124. Thus, as conditions change, the communication speed processor 160 can quickly look at data in the data storage structure 158 to determine the expected communication speed corresponding to the current network conditions.

In addition to number of users and activity of those users within a sector, it has been shown that the location of the wireless communication device 106 within the sector may also affect the expected communication speed. The RAN 114 can utilize known network technology to determine the location of various wireless communication devices within a sector. Location based technology is known in the art and need not be described in greater detail herein. However, a location determination server (not shown) in the network can provide location data to the communication speed processor 160. In one embodiment, the data may be provided in a binary form to indicate that the wireless communication device 106 is near the base station 104 (see FIG. 1) or that it is far from the base station. Alternatively, the communication speed processor may provide data indicating that the wireless communication device 106 is near the base station 104, or is at an intermediate distance from the base station, or is far from the base station. In the example of FIG. 4C, the communication speed processor 160 only utilizes a near/far designation. In this embodiment, the communication speed processor 160 can make an initial determination of an expected communication speed using the data of the table in FIG. 4A or the data from the table in FIG. 4B. Following that determination, the communication speed processor 160 may revise the expected speed estimate based on the relative position of the wireless communication device 106 with respect to the base station 104 and with respect to other wireless communication devices within the sector. The data in FIG. 4C may be used when all users within a sector are either all performing download operations or upload operations. In the data of FIG. 4C, the first column provides the expected communication speed for a user (i.e., user 1) who is near the base station (e.g., the base station 104 of FIG. 1). In the first data entry, no other users are in the same sector (either near or far from the base station). Thus, the expected communication speed for a downlink operation (top portion of FIG. 4C) is 1,748 kbps. In contrast, if user 1 (e.g., the user of the wireless communication device 106 in FIG. 1) were near the base station and two other users were operating in the same sector but far from the base station, the communication speed processor 160 (See FIG. 3) would use the third entry in the top portion of the data tables in FIG. 4C. Thus, the expected communication speed is 844 kbps. In another example, if user 1 wishes to perform an uplink operation and two other users are operating far from the base station, the communication speed processor 160 would use the third entry in the lower portion of the data tables in FIG. 4C. Thus, the expected communication speed for user 1 near the base station is 367 kbps.

As demonstrated by the data in FIG. 4C, the available communication speed is essentially shared equally among the number of users either near or far from the base station 104. This is true of download operations or upload operations. Although not illustrated herein, the system 100 could also include a near-far set of data tables for mixed operations where the user of the wireless communication device 106 wishes to perform a downlink process while other users in the same sector are performing uplink operations. Similarly, additional data could be provided to indicate an expected communication speed where the user of the wireless communication device 106 wishes to perform an uplink operation while other users in the same sector are performing downlink operations. Thus, the data storage structure 158 may be expanded to provide data for various combinations of operations (e.g., all uploads, all downloads, or mixed uploads/downloads) as well as data reflecting the relative positions of wireless communication devices within a sector. Because the data in the data storage structure 158 is precalculated, the communication speed processor 160 need only determine the current local network conditions in order to select the appropriate data table. No other calculations are required by communication speed processor. That is, the communication speed processor 160 merely determines the correct data table to use and applies the appropriate current network conditions to select an entry in the data table that results in the expected communication speed. This look-up process can be performed very quickly by the communication speed processor 160.

As discussed above, the communication speed processor may average the data entries to determine an expected communication speed. In yet another embodiment, the communication speed processor 160 (see FIG. 3) can calculate a weighted average of the data in the tables of FIGS. 4A-4C. For example, the data in the tables of FIG. 4A may be combined in some weighted manner with the data from FIG. 4C to compensate for known variations in speed based on the relative position of the wireless communication devices within a sector. The specific weighting factors for each data table are within the knowledge of one of ordinary skill in the art and need not be described in greater detail herein.

As previously discussed, the RAN 114 is a commercial product available from various manufacturers. Ideally, the installation of the RAN 114 within the communication network would be operationally independent of the manufacturer. That is, it is desirable that the performance characteristics of each RAN be identical no matter who has manufactured the device. However, it has been determined that some performance characteristics may vary from one manufacturer to another. Thus, the data in the data storage structure 158 (see FIG. 3) may vary depending on the manufacturer. The tables in FIGS. 4A-4C are provided for one manufacturer. However, similar calculations can be readily performed for other RAN manufacturers. In a typical market area, such as a city or region, the wireless communication network 102 typically includes multiple RANs from a single manufacturer. Thus, the data storage structure 158 may be stored within the RAN itself or in a more central location for a metropolitan region. For example, the data storage structure 158 may be stored in the mobile switching center (not shown) or other physical location on the communication network.

Once the communication speed processor 160 has calculated an expected communication speed, it may generate data indicative of the expected communication speed in a variety of manners. In one embodiment, the communication speed processor 160 sends a raw number (e.g., 459 kbps) to the communications manager 138 (see FIG. 2) of the wireless communication device 106. The communications manager 138 may display the raw data number to indicate an expected communication speed for the user of the wireless communication device 106. However, the expected communication speed may be displayed to the user in a variety of useful formats. In one example, the communication speed may also be indicated as a set of bars similar to the signal strength bars of a conventional wireless communication device. Thus, the communications manager 138 generates one display with a series of bars to indicate the signal strength and another display with a set of bars to indicate the expected communication speed. In another example, the communications manager 138 may generate an indicator on the display 134 in the form of a meter whose needle indicates the expected communication speed. In yet another embodiment, the communications manager 138 may display the data in the form of a number on a predetermined scale (e.g., a scale of 1 to 10) where a higher number indicates a higher expected communication speed. In yet another alternative embodiment, the communications manager 138 may provide an indication on the display 124 to indicate the type of data transfer that would be appropriate for the expected communication speed. For example, if the communication speed processor 160 (see FIG. 3) has calculated a low expected communication speed, the communications manager 138 may indicate this on the display 124 in the form of an activity, such as "E-MAIL." If the expected communication speed is high, the communications manager 138 may generate an indicator on the display 124, such as "VIDEO," to indicate that the expected communication speed is sufficient to accommodate video or multimedia uploads or downloads. Of course, the user of the wireless communication device 106 is not obligated to use the wireless communication device only for the activities indicated by the wireless communication manager 138. For example, if the expected communication speed indicates "VIDEO," the user may still use the wireless communication device to download other files, such as e-mail, music, web browsing, or the like.

In yet another alternative embodiment, communications manager 138 may generate an indicator on the display 124 in the form of a changing light where, by way of example, red indicates a slower speed, yellow indicates an intermediate speed, and green indicates a higher expected communication speed. This embodiment provides the user with a simple indication of the expected communication speed.

Those skilled in the art will appreciate that numerous other techniques may be used to provide a visual indication to the user of the wireless communication device 106. The system 100 is not limited by any particular form of indicator of the expected communication speed.

While the communication speed processor 160 may calculate a raw data number based on one or more of the data entries of FIGS. 4A-4C, it may be more convenient to express that number in the form of a banded expected communication speed indicator. For example, the range of communication speeds may be subdivided into two or more bands. For example, if the communications manager 138 (see FIG. 2) will display the expected communication speed as a set of one to five bars, the expected communication speed may be banded into five possible communication speed ranges with a low range of expected communication speed corresponding to one bar and a high expected communication speed corresponding to five bars.

This calculation may be done by the communication speed processor 160. However, different wireless communication devices may have different visual indicators for the expected communication speed. Accordingly, in one embodiment, the communication speed processor 160 simply transmits the expected speed data to the wireless communication device 106 and the communications manager 138 generates the appropriate banded data for the expected communication speed indicator. Thus, the communications manager 138 may generate 1 to 5 bars corresponding to 1 to 5 expected bands of communication speed in one wireless communication device. In another wireless communication device, the communications manager 138 may divide the expected communication speed into three bands corresponding to slow, medium, and fast (or red, yellow, and green, as described above). In yet another embodiment, the communications manager 138 may subdivide the range of expected communication speeds into 10 bands corresponding to a numerical value of 1 to 10. In yet another embodiment where a digital version of a meter provides an expected communication speed, the communications manager 138 may simply display the expected communication speed along a continuum from a low speed to high speed. Those skilled in the art will appreciate that the specific break points between bands for purposes of the various illustrated display modes is well within the knowledge of one of ordinary skill in the art. The specific break points are an engineering decision that can be made to provide the user with a useful form of expected communication speed.

As conditions within the wireless communication network change, the communication speed processor 160 (see FIG. 3) is constantly recalculating expected communication speed for each of the wireless communication devices within the area of coverage for the RAN 114. Thus, the communications manager 138 for each wireless communication device will alter the visual display as local network conditions change. For example, if additional users access the RAN 114, the expected communication speed will go down. The communication speed processor 160 utilizes the data in the tables of FIGS. 4A-4C to determine a new expected communication speed for each of the wireless communication devices within its area of coverage. Similarly, if a user has just completed a download, the expected communication speed for others of the wireless communication devices in that sector are expected to increase. The communication speed processor 160 calculates the new expected communication speed for each of the wireless communication devices within its area of coverage. The base station interface controller 156 transmits this data to the various base stations (e.g., the base station 104 of FIG. 1) for transmission to each of the individual wireless communication devices communicating with that particular base station. Thus, each wireless communication devices receives data indicative of the expected communication speed for that particular wireless communication device. As conditions in the network change, the expected speed indicator for each wireless device is updated by the network. Thus, the user receives an expected communication speed indicator separate from and independent of any signal strength indicator.

Figure 5:
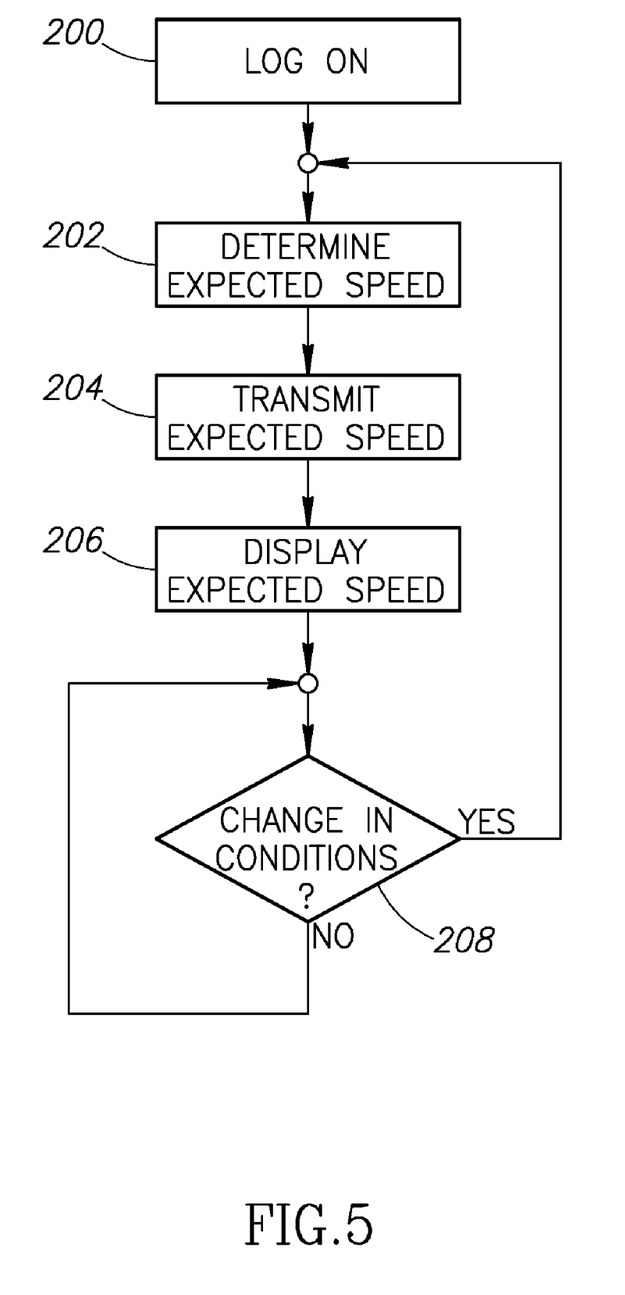
FIG. 5 is a flow chart illustrating an exemplary process used by the system of the present invention.

FIG. 5 is a flow chart illustrating the operation of the system 100 in an exemplary embodiment. At step 200, a user of a wireless communication device turns on the wireless communication device and/or logs on to the wireless communication network 102 (see FIG. 1). At step 202, the communication speed processor 160 (see FIG. 3) calculates an expected communication speed. As discussed above, the communication speed processor 160 may use the data from the tables of FIGS. 4A-4C alone or in combination. The combination may be a conventional average or other statistical combination. The data from the different tables may be a weighted average or combination.

In step 204, the network transmits the expected communication speed to the wireless communication device (e.g., the wireless communication device 106 of FIG. 1) via the RAN 114 and the base station 104. In step 206, the communications manager 138 (see FIG. 2) displays the expected communication speed on the display 124.

As discussed above, the expected communication speed is dynamically calculated based on a number of factors that may change over time. Indeed, the local network conditions may change in a very short period of time. For example, additional users may access the network thus reducing the available expected communication speed for any individual user. In contrast, users may log off the network or leave an area thus making more bandwidth available for other users. In addition, activities such as the completion of a download operation may make more bandwidth available for other users.

In decision 208, the system 100 determines whether there has been a change in network conditions. That is, the system determines whether greater or fewer users are now in the same sector as the wireless communication device 106 and whether the locations of the users within the sector have changed or user activities have changed. If there is no change in conditions, the result of decision 208 is NO and the system returns to decision 208 in a loop until some change in conditions is detected.

When a change in conditions is detected, the result of decision 208 is YES and the system returns to step 202 to permit the communication speed processor 160 (see FIG. 3) to determine a new expected communication speed. Thus, the process continually checks for the change in network conditions and calculates a new expected communication speed and transmits that new expected communication speed to the wireless communication device. As noted above, this process is performed for each wireless communication device within the area of coverage of the base station 104.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A device comprising:
a transmitter in communication with a network;
a receiver in communication with the transmitter; and
a communications manager in communication with the transmitter, the communications manager configured to process, from a data storage structure on the network, an expected communication speed between the network and the wireless communication device based on a first number of wireless communication devices actively downloading from the network and a second number of idle wireless communication devices in communication with the network, the communications manager further configured to generate an output indicative of the expected communication speed.

2. The device of claim 1 wherein the communications manager is in communication with a display and wherein the generated output from the communications manager includes an indicator on the display.

3. The device of claim 2 wherein the indicator includes a graphical display indicative of the expected communication speed.

4. The device of claim 2 wherein the indicator includes a plurality of display bars indicative of the expected communication speed.

5. The device of claim 2 wherein the indicator includes a numeric display indicative of the expected communication speed.

6. The device of claim 2 wherein the expected communication speed is further based on an application type.

7. The device of claim 6 wherein the expected communication speed is further based on the download of a selected file type.

8. The device of claim 1 wherein the communications manager is further configured to generate the output indicative of the expected communication speed on an uplink between the device and the network using the transmitter.

9. The device of claim 1 wherein the communications manager is further configured to generate the output indicative of the expected communication speed on a downlink between the device and the network using the receiver.

10. The device of claim 1 wherein the expected communication speed is further based on a third number of wireless communication devices communicating with the network in a region proximate the transmitter.

11. The device of claim 1 wherein the transmitter is located within a sector of a coverage area provided by the network, and the expected communication speed is further based on a fourth number of wireless communication devices communicating with the network in the sector.

12. The device of claim 10 wherein the third number includes a fifth number of wireless communication devices actively downloading from the network and a sixth number of idle wireless communication devices in communication with the network.

13. The device of claim 10 wherein the third number includes a seventh number of wireless communication devices actively uploading to the network.

14. The device of claim 1 wherein the transmitter communicates with the network via a base station, and the expected communication speed is further based on a first distance between the base station and the transmitter.

15. The device of claim 14 wherein the expected communication speed is further based on a plurality of second distances between the base station and each of at one wireless communication device communicating with the network via the base station.

16. The device of claim 1 wherein the transmitter communicates with the network via a Radio Access Network (RAN) and the expected communication speed is further based on a RAN type.

17. A system comprising:
a transmitter configured to transmit data to a wireless communication device;
a receiver configured to receive data from the wireless communication device; and
a data storage structure containing an expected communication speed, the transmitter being further configured to transmit the expected communication speed to the wireless communication device based on a first number of wireless communication devices actively downloading from a network and a second number of idle wireless communication devices in communication with the network.

18. The system of claim 17 wherein the expected communication speed is further based on a third number of wireless communication devices communicating with the network in a region proximate the wireless communication device.

19. The system of claim 17 wherein the wireless communication device is located within a sector of a coverage area provided by the network, and the expected communication speed is further based on a fourth number of wireless communication devices communicating with the network in the sector.

20. The system of claim 18 wherein the third number includes a fifth number of wireless communication devices actively downloading from the network and a sixth number of idle wireless communication devices in communication with the network.

21. The system of claim 18 wherein the third number includes a seventh number of wireless communication devices actively uploading to the network.

22. The system of claim 17 wherein the wireless communication device communicates with the network via a base station, and the expected communication speed is further based on a first distance between the base station and the wireless communication device.

23. The system of claim 22 wherein the expected communication speed is further based on a distance between the base station and each of at least one other wireless communication device communicating with the network via the base station.

24. The system of claim 17 wherein the data structure contains the expected communication speed for communication on an uplink between the wireless communication device and the network.

25. The system of claim 17 wherein the data structure contains the expected communication speed for communication on a downlink between the wireless communication device and the network.

26. The system of claim 17 wherein the wireless communication device communicates with the network via a Radio Access Network (RAN) and the expected communication speed is further based on a RAN type.

27. The system of claim 17 wherein the data structure contains data indicative of the expected communication speed between the network and at least the first and second number of wireless communication devices, the transmitter being further configured to transmit the expected communication speed to each of the the first and second number of wireless communication devices.

28. A method comprising:
transmitting, to a selected one of a plurality of wireless communication devices in communication with a network, an expected communication speed between the selected one of the plurality of wireless communication devices and the network based on a first number of the plurality of wireless communication devices actively downloading from the network and a second number of the plurality of wireless communication devices in idle communication with the network.

29. The method of claim 28 wherein the expected communication speed is further based on a third number of the plurality of wireless communication devices communicating with the network in a region proximate the selected one of the plurality of wireless communication devices.

30. The method of claim 28 wherein the selected one of the plurality of wireless communication devices is located within a sector of a coverage area provided by the network, and wherein the expected communication speed is further based on a fourth number of the plurality of wireless communication devices communicating with the network in the same sector as the selected one of the plurality of wireless communication devices.

31. The method of claim 29 wherein the third number includes a fifth number of the plurality of wireless communication devices actively downloading from the network and a sixth number of the plurality of wireless communication devices in idle communication with the network.

32. The method of claim 28 wherein the third number includes a seventh number of the plurality of wireless communication devices actively uploading to the network.

33. The method of claim 28 wherein the selected one of the plurality of wireless communication devices communicates with the network via a base station, and the expected communication speed is further based on a first distance between the base station and the selected one of the plurality of wireless communication devices.

34. The method of claim 33 wherein the expected communication speed is further based on a second distance between the base station and each other of the plurality of wireless communication devices communicating with the network via the base station.

35. The method of claim 28 wherein the selected one of the plurality of wireless communication devices communicates with the network via a Radio Access Network (RAN) and the expected communication speed is further based on a RAN type.

36. The method of claim 28 further comprising generating data indicative of an expected communication speed between the network and each of the plurality of wireless communication devices, and
transmitting the expected communication speed between the network and each of the plurality of wireless communication devices to each of the respective ones of the plurality of wireless communication devices.

* * * * *